W. P. M. BRAUN.
GANG LAWN MOWER.
APPLICATION FILED FEB. 4, 1918.

1,294,387.

Patented Feb. 18, 1919.
3 SHEETS—SHEET 1.

Inventor
William P. M. Braun
by Cornelius D. Ehret
his Attorney

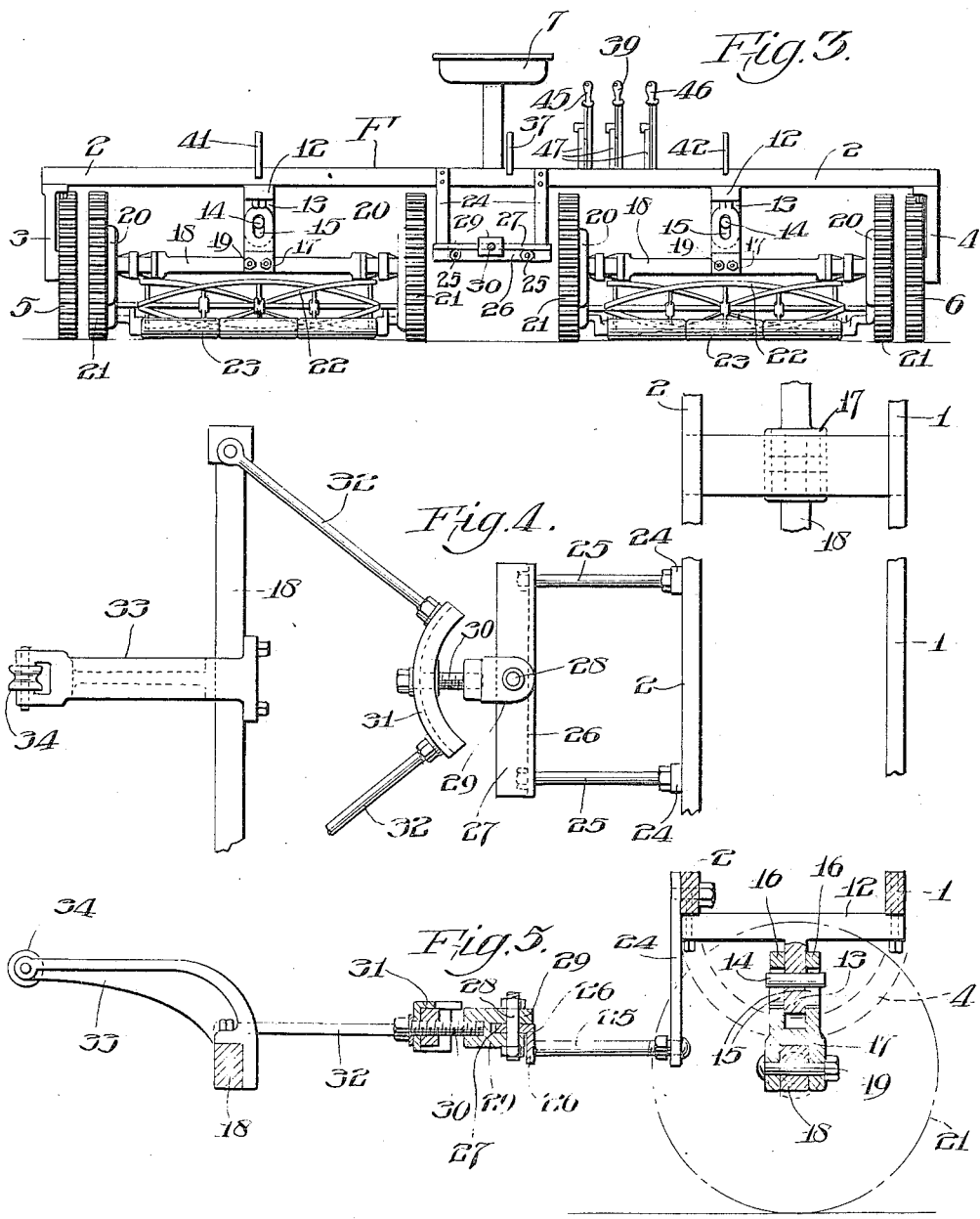

W. P. M. BRAUN.
GANG LAWN MOWER.
APPLICATION FILED FEB. 4, 1918.
1,294,387.
Patented Feb. 18, 1919.
3 SHEETS—SHEET 3.
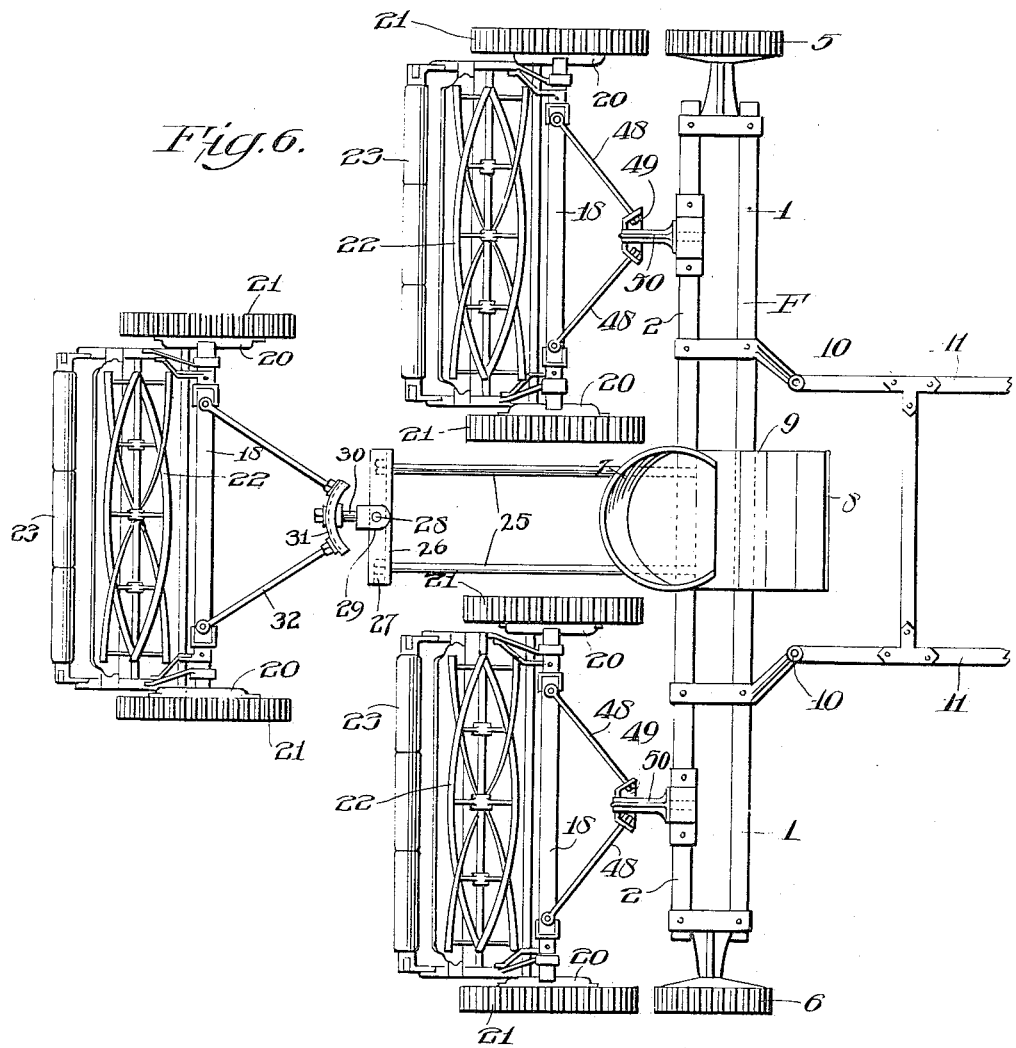
Fig. 6.
Fig. 7.
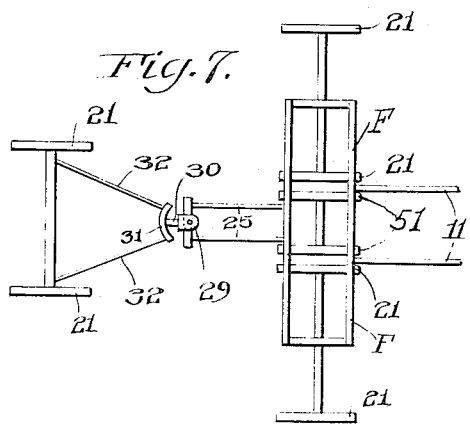
Inventor
William P. M. Braun
by Cornelius D. Ehret
his Attorney

UNITED STATES PATENT OFFICE.

WILLIAM P. M. BRAUN, OF PHILADELPHIA, PENNSYLVANIA, ASSIGNOR TO PENNSYLVANIA LAWN MOWER WORKS, OF PHILADELPHIA, PENNSYLVANIA, A CORPORATION OF PENNSYLVANIA.

GANG LAWN-MOWER.

1,294,387.            Specification of Letters Patent.      Patented Feb. 18, 1919.

Application filed February 4, 1918. Serial No. 215,378.

*To all whom it may concern:*

Be it known that I, WILLIAM P. M. BRAUN, a citizen of the United States, residing in the city of Philadelphia, county of Philadelphia, and State of Pennsylvania, have invented certain new and useful Improvements in Gang Lawn-Mowers, of which the following is a specification.

My invention relates to gang lawn mowers comprising a plurality of mower units each capable of independent movement for accommodating itself to undulations in the ground surface and all interconnected with a frame carried upon a ground engaging wheel or roller mechanism independent of the mower units, the mower units having ground engaging wheels for driving their cutter mechanisms.

My invention resides in structure of the character hereinafter described and claimed.

For an illustration of some of the various forms my invention may take, reference may be had to the accompanying drawings, in which:

Fig. 3 is a rear elevational view of the structure shown in Fig. 1, with a rear mower unit omitted.

Fig. 4 is a fragmentary top plan view of the structure for connecting a mower unit to the frame.

Fig. 5 is a sectional view, some parts in elevation, of the structure shown in Fig. 4.

Fig. 6 is a top plan view of a modified arrangement of gang mower.

Fig. 7 is a diagrammatic top plan view of a further modification.

Figure 1:
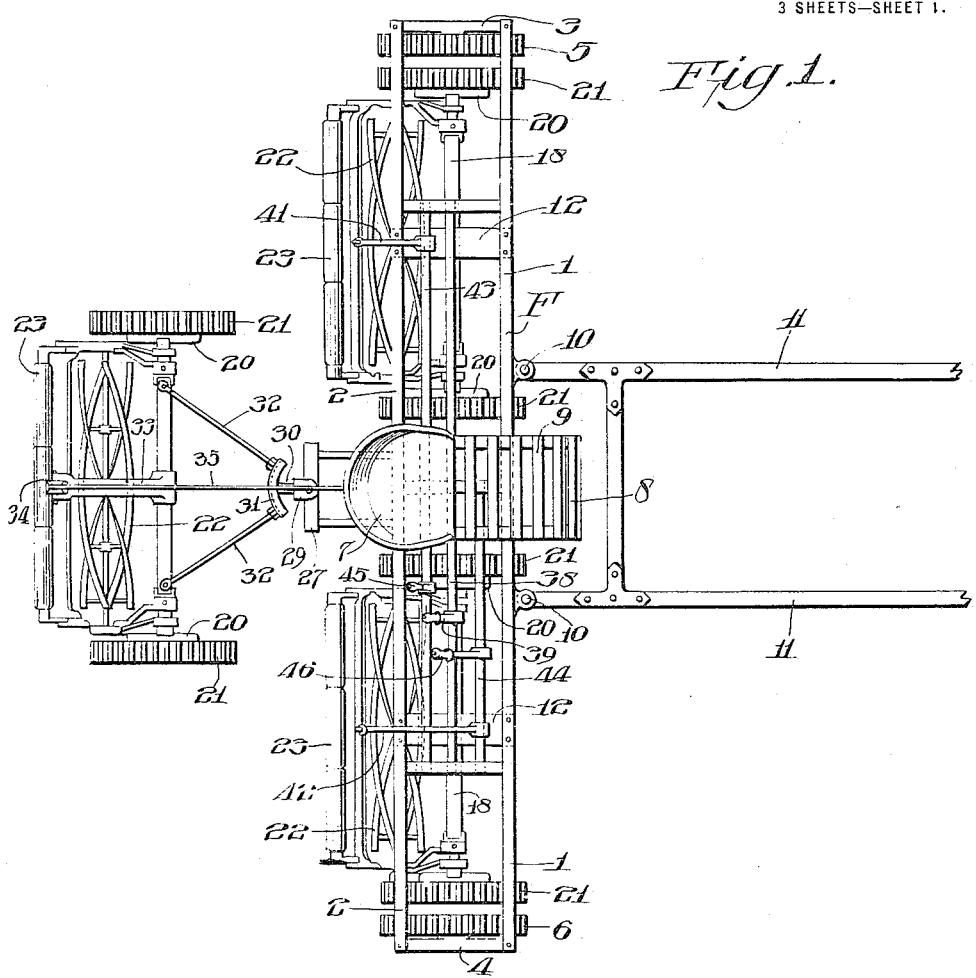
Figure 1 is a top plan view of a mower embodying my invention.
Figure 2:
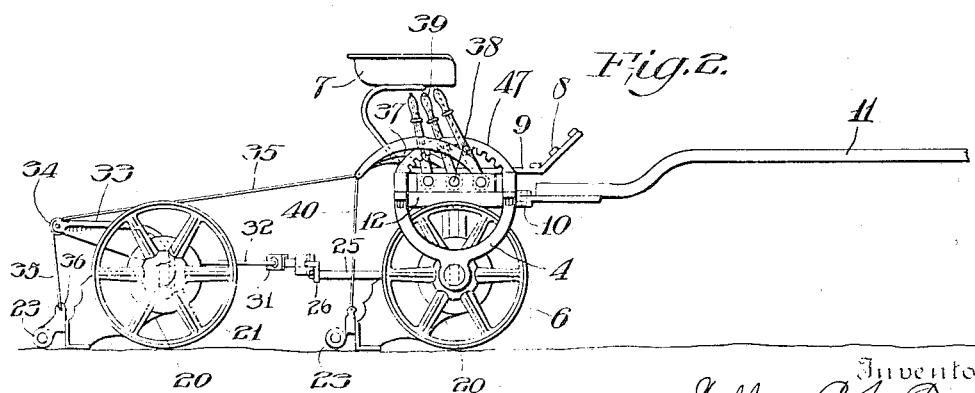
Fig. 2 is a side elevation of the mower shown in Fig. 1.

Referring to Figs. 1 to 5 inclusive, F is a frame comprising the transversely extending beams 1 and 2 with the end brackets 3 and 4 in which are journaled the ground engaging wheels 5 and 6 which roll upon the ground and carry the frame F.

Upon the frame is carried the seat 7 for the operator or driver, for whom is provided the foot rest 8 and latticed floor 9, also carried by the frame.

Attached to the frame at 10, 10 are the shafts 11, 11, to which may be attached the harness of a horse for pulling the gang mower over the lawn to be mowed, the shafts 11 being preferably so attached to the frame that they tend to move therewith as a unit, as in the case of a vehicle known as a sulky.

On each side of the center of the frame F there is attached thereto a bracket 12 having at its center the downwardly extending lug or projection 13 carrying the horizontal pin 14 extending into the vertical slots 15 in the vertically extending lugs or ears 16, 16 embracing the aforementioned lug or projection 13, the lugs 16, 16 being integral with the member 17, having on its under side a channel-shaped recess receiving the wooden or other bar or beam 18. The member 17 is secured in fixed position with respect to the bar 18 by one or more bolts 19.

Each bar or beam 18 is attached in any suitable way to the gear casings 20 of a lawn mower unit having the usual ground engaging wheels 21 on which the gear casings are pivoted in the well known manner, the gears within the casings being driven by the ground engaging wheels 21 and in turn driving the rotary cutter mechanism 22 behind which is disposed the idler or ground engaging roller 23, as well understood in the art.

Secured at their upper ends to the frame F between the inner ground engaging wheels 21 of the neighboring mower units of the front rank are the downwardly extending members 24, to whose lower ends are secured the horizontal rearwardly extending bolts or bars 25 attached at their rear ends to the vertical flange 26 of an angle iron whose horizontal flange 27 carries at its center the vertical pivot pin or bolt 28 passing through the members 29, 29, between which is loosely received the horizontal flange 27 of the angle iron. The pivot 28 is preferably located about midway between the axes of the ground engaging wheels 21 of the front and rear mower units. The members 29 are attached to a horizontal bolt or pivot pin 30, on which is pivoted the bracket 31 connected by tie rods or braces 32, 32 with the bar or beam 18 of the rear mower unit, which may be similar in structure to the mower units of the front rank.

On the beam 18 of the rear mower unit may be provided a bracket 33 carrying a pulley or idler 34 over which passes a cord or chain 35 attached at its one end at 36 to the frame of the cutter mechanism of the rear mower unit and at its other end to the lever 37 secured at the middle of the frame F to the shaft 38 having attached thereto the hand lever 39. Similarly the frames of the front mower units may be connected by cords or chains 40 to the lever arms 41 and 42 secured, respectively, upon the shafts 43 and 44, to which are attached respectively the hand levers 45 and 46. The hand levers 39, 45 and 46 are disposed adjacent the operator's seat 7 within reach of the operator, who by moving any of said levers may cause the attached cutter mechanism to be raised to any suitable distance from the ground. With the hand levers may be associated arc members 47 having teeth or notches with which suitable members on the hand levers may engage to hold the cutter mechanisms in any desired elevated position.

The operation is as follows:

In pulling the gang mower over the ground, the front mower units cut separate swaths, leaving an intervening stretch cut by the cutter mechanism of the trailing unit.

In turning a corner or taking a curvilinear path, the rear mower unit swings about the vertical pivot pin 28, the cutter mechanism of the rear mower unit being, however, of a length and at such distance from the cutter mechanisms of the front mower units that the stretch left by the cutter mechanism of the front units is mowed by the rear units.

When the ground is undulating, the front mower units may oscillate transversely upon their pivot pins 14 while the rear mower unit may oscillate upon the pivot 30, so that all independently conform to the undulating surface of the ground.

Furthermore, the front mower units may rise and fall with respect to and independently of the frame F because of the lost motion in the pin and slot connection 14, 15.

The rear mower unit is at such distance from the frame F that it can readily rise and fall with respect thereto, due to the usual amounts of lost motion incident to the mechanical connections between the rear mower unit and the frame; and for this purpose the lost motion between the horizontal flange 27 and the members 29, 29 may be made sufficient for the purpose.

While in the above-described arrangement the mower units of the front rank are disposed immediately beneath the frame F, with their ground engaging wheels 21 substantially co-axial with the frame supporting wheels 5 and 6, the mower units of the front rank may be disposed in any other suitable manner, as for example, as in Fig. 6, where they trail behind the frame F, the frame supporting wheels 5 and 6 being in longitudinal alinement with the outer ground engaging wheels 21, 21 of the mower units. In this case, the beams or bars 18 of the front mower units are connected by rods 48 to the member 49 having freedom of movement upon the horizontal member 50 attached to the frame F, as by structure similar to members 31 and 30, the freedom of movement allowing lateral oscillation of the mower units as well as rise and fall with respect to the frame F.

The rear mower unit is attached to the frame by mechanism similar to that described in connection with Figs. 1 to 5 inclusive.

Or as indicated diagrammatically in Fig. 7, the frame F may rest upon ground engaging roller or wheel mechanism 51 disposed at the middle of the frame, in which case the mower units may be either directly beneath the frame as shown, or to the front or rear of the frame, as in Fig. 6.

While I have herein shown the front rank as comprising more mover units than the rear rank, it will be understood that the arrangement may be reversed without departure from the spirit of my invention.

After the lawn has been mowed, it may be rolled. For this purpose, the mower units may be detached from the frame and associated parts herein described, and suitably heavy ground rollers, preferably of widths equal to the widths of cutter mechanisms of the mower units, may be attached in place of the mower units. By such structure the rollers may be moved over the lawn and each roller, being flexibly attached to the frame, may oscillate and move independently of the other rollers and independently of the frame.

What I claim is:

1. In a gang lawn mower, the combination with a frame, of a plurality of mower units disposed in different ranks and each comprising a ground engaging wheel and rotary cutter mechanism driven thereby, means rolling upon the ground and carrying said frame independently of said mower units, and means connecting said mower units to said frame and allowing independent oscillation in a vertical plane with respect to said frame.

2. In a gang lawn mower, the combination with a frame, of means rolling upon the ground and carrying said frame, a plurality of mower units each comprising a ground engaging wheel and rotary cutter mechanism driven thereby, means connecting said units to said frame and allowing oscillation with respect to said frame, the ground engaging wheel of at least one of said mower units having its axis disposed in substantially the same vertical plane with the axis of said frame carrying means.

3. In a gang lawn mower, the combination with a frame, of means rolling upon the ground and carrying said frame, a plurality of mower units each comprising a ground engaging wheel and rotary cutter mechanism driven thereby, said mower units disposed side by side with the axes of their ground engaging wheels in substantially the same vertical plane with the axis of said means carrying said frame, and pivotal connections between said mower units and said frame.

4. In a lawn mower, the combination with a frame, of means rolling upon the ground and carrying said frame, a mower unit comprising a ground engaging wheel and rotary cutter mechanism driven thereby, the axes of said frame carrying means and said ground engaging wheel being disposed in substantially the same vertical plane, and a pivotal connection between said mower unit and said frame.

5. In a gang lawn mower, the combination with a frame, of ground engaging wheels at opposite ends thereof carrying said frame, a plurality of mower units each comprising a ground engaging wheel and rotary cutter mechanism driven thereby, said mower units disposed in different ranks, pivotal connections between said mower units and said frame allowing independent movements of said mower units with respect to said frame, the ground engaging wheels of a plurality of said mower units having their axes in the same vertical plane with the axes of said frame carrying wheels.

6. In a gang lawn mower, the combination with a frame, of a plurality of mower units disposed in different ranks and each comprising a ground engaging wheel and rotary cutter mechanism driven thereby, means rolling upon the ground and carrying said frame independently of said mower units, and a pivotal connection between each of said mower units and said frame allowing oscillation of each mower unit to accommodate itself to undulations in the ground surface.

7. In a lawn mower, the combination with a frame, of means rolling upon the ground supporting said frame, a mower unit comprising a ground engaging wheel and rotary cutter mechanism driven thereby, and a pin and slot connection between said mower unit and said frame allowing vertical and oscillatory movement of said mower unit with respect to said frame.

8. In a gang lawn mower, the combination with a frame, of a plurality of mower units disposed in different ranks and each comprising a ground engaging wheel and rotary cutter mechanism driven thereby, means rolling upon the ground and carrying said frame independently of said mower units, means allowing pivotal movement of one rank with respect to another for allowing the gang mower to take a curvilinear path, and pivotal connections between the mower units and said frame.

9. Lawn mower structure comprising a frame, mower mechanism comprising ground engaging means and rotary cutter mechanism driven thereby, a pivotal connection between said mower mechanism and said frame, means carried by said frame for raising said cutter mechanism from the ground, and means rolling upon the ground and carrying said frame independently of said ground engaging means of the mower mechanism.

10. In a gang lawn mower, the combination with a frame, of means rolling upon the ground and carrying said frame, a plurality of mower units disposed in different ranks and each comprising a ground engaging wheel and rotary cutter mechanism driven thereby, means connecting said mower units to said frame, and means carried by said frame for raising one or more of the cutter mechanisms from the ground.

11. Lawn mower structure comprising a frame, mower mechanism comprising ground engaging wheels and a rotary cutter mechanism driven thereby, a pivotal connection between said mower mechanism and said frame, means rolling upon the ground and carrying said frame independently of said ground engaging wheels of the mower mechanism, and a draft member for pulling said frame over the ground and rigidly attached to said frame as regards movement of said draft member in a vertical plane.

12. In a gang lawn mower, the combination with a frame, of a plurality of mower units each comprising a ground engaging wheel and rotary cutter mechanism driven thereby, a pivot connecting each of said mower units individually to said frame, means rolling upon the ground and carrying said frame independently of said mower units, means attached to said frame for moving the same and said mower units over the ground, and a seat carried by said frame independently of said mower units.

13. Lawn mower structure comprising a frame, mower mechanism comprising ground engaging means and rotary cutter mechanism driven thereby, means flexibly connecting said mower mechanism to said frame, means rolling upon the ground and carrying said frame independently of said ground engaging means of said mower mechanism, a draft member, and means connecting said draft member rigidly to said frame as regards movement of said draft member in a vertical plane.

14. In a gang lawn mower, the combination with a frame, of means rolling upon the ground and carrying said frame, a plurality of mower units disposed in different ranks and each comprising a ground engaging wheel and rotary cutter mechanism driven thereby, means flexibly connecting each of said mower units to said frame, a draft member, and means for connecting said draft member rigidly to said frame as regards movements of said draft member in a vertical plane.

15. In a gang lawn mower, the combination with a frame, of a plurality of mower units each comprising a ground engaging wheel and rotary cutter mechanism driven thereby, means flexibly connecting each mower unit to said frame, means rolling upon the ground and carrying said frame independently of said ground engaging wheels of said mower units, a draft member rigidly connected to said frame as regards movement of said draft member in a vertical plane, a seat carried on said frame, and means carried by said frame for raising one or more of said cutter mechanisms from the ground.

In testimony whereof I have hereunto affixed my signature this 29" day of January, 1918.

WILLIAM P. M. BRAUN.